UNITED STATES PATENT OFFICE.

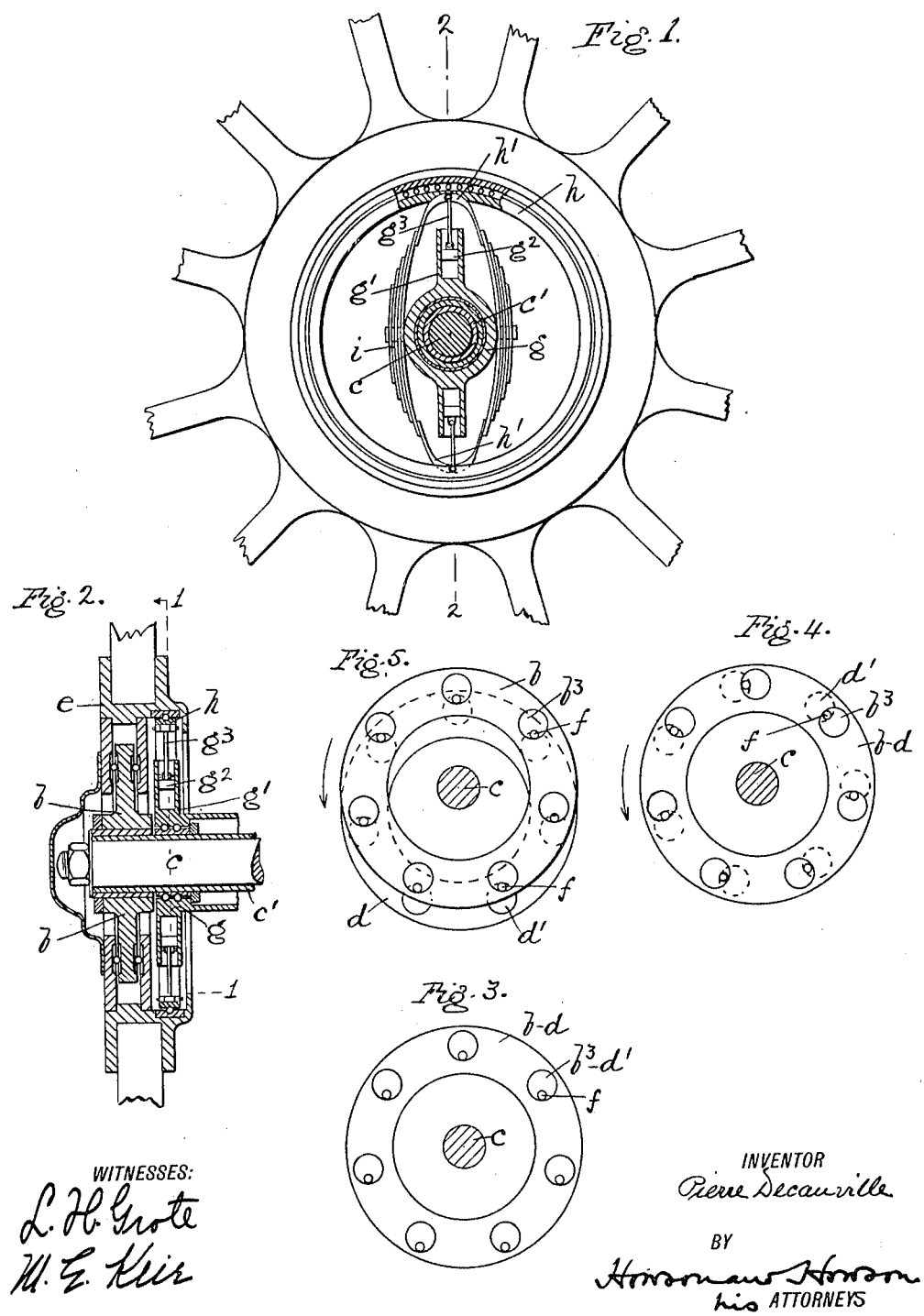

PIERRE DECAUVILLE, OF PARIS, FRANCE.

RESILIENT WHEEL.

1,001,513. Specification of Letters Patent. Patented Aug. 22, 1911.

Application filed December 3, 1908. Serial No. 465,895.

*To all whom it may concern:*

Be it known that I, PIERRE DECAUVILLE, a citizen of the Republic of France, and residing at Paris, France, have invented a certain new and useful Improvement in Resilient Wheels, of which the following is a specification.

The present invention relates to a novel means for resiliently supporting a wheel upon its axle and is especially adapted for a wheel in which independent wheel parts are operatively connected with lost motion by interposed balls or the like.

In the accompanying drawings Figure 1 is a vertical section on the line 1—1, Fig. 2, partly broken away showing a wheel to which my novel suspension device is applied in one form; Fig. 2 is a section on the line 2—2, Fig. 1; Figs. 3, 4 and 5 are diagrammatic side elevations showing the relative displacement of the engaging plates and balls.

In the form shown, I secure the resilient support of the wheel upon its axle $c$ through a ring $g$ which is solid with the chassis of the vehicle and which carries diametrically opposite vertical cylinders $g^1$ in which work pistons $g^2$, the rods $g^3$ of which are jointed at their inner ends to the pistons $g^2$ and at their outer ends to a ring $h$ on which the hub portion $e$ of the wheel revolves, preferably through intermediate ball bearings of common type. Springs $i$ are secured to the ring $g$ at right angles to the cylinders $g^1$ and their extremities bear upon arms $h^1$ solid with the ring $h$. The pistons $g^2$ may be supported within the cylinders $g^1$ by any suitable resilient means, for example suitably compressed air. The springs $i$ serve to return the wheel to position after it has been rendered eccentric to the driving disk $b$ about to be described.

The axle $c$ or the sleeve $c^1$ surrounding it, which receives the driving effect, is solid with a disk $b$, and rotates the latter. Lying on either side of the disk $b$ are arranged two rings $d$ solid with the hub $e$. A series of cupped recesses $b^3$ on each face of the disk and a corresponding series of cupped recesses $d^1$ on the juxtaposed faces of the rings $d$, form pockets to receive a series of balls $f$, the diameter of which is such that the rings $d$ are held out of contact with the disk $b$.

In the condition of repose and when the vehicle is normally loaded the axes of the rings $d$ and disk $b$ coincide and the balls $f$ are at the bottoms of the cups (Fig. 3). As soon as the disk $b$ receives its rotary driving impulse, it is displaced angularly relatively to the rings $d$; the cups $b^3$ drive the balls in the direction of their movement until the balls are gripped between the secant edges of the coöperating cups $d^1$, thereby rendering the disk and rings solid with relation to each other and imparting to the rings (and thus to the wheel as a whole) the impulse of disk $b$. The balls thus wedged between the cups $b^3$ and $d^1$ permit the rings $d$ to become eccentric relative to the plate $b$ without interrupting the driving movement. The maximum eccentricity of the rings $d$ is equal to the diameter of the cup less the diameter of the ball. These balls being always wedged between the intersecting edges of the cup may assume any position between the maximum position represented in Fig. 5 and the normal position shown in Fig. 4. In this connection it should be noted that for the efficient operation of the balls it is essential that their play shall be entirely free throughout the surface of the cup.

This arrangement of the driving mechanism together with the resilient support of the wheel upon the axle above described, affords an exceedingly easily-running suspension device which permits the axle to assume any degree of eccentricity with relation to the wheel, (within the limits of the area of the ball cups) and a continuous drive of the wheel whatever the relative positions of the axes to the wheel and of the hub may be.

I claim as my invention—

1. A spring wheel comprising a driving and a driven member and means for actuating the latter from the former, a wheel spindle by which said driving and driven members are carried, in combination with resilient means for cushioning said driven member with relation to the wheel spindle, said resilient means comprising diametrically opposite cylinders and a rotary support therefor constantly coaxial with the driving member of the wheel, a ring journaled in the driven member of the wheel and plungers connected thereto working in said cylinders, and means in connection with said cylinders for resiliently supporting said plungers in said cylinders, together with spring means engaging said ring and acting upon the same at right angles to the action of the said pistons whereby said driven member is forced back into coaxial relation to the driving member upon being rendered eccentric thereto, substantially as described.

2. A wheel of the character described, comprising reciprocally cupped members fast with the driving and driven members and balls in said cups forming bearings between said members, said cups being so shaped on their bearing surfaces as to maintain practically a constant space between the same while engaging the said balls between their secant edges to form an actuating connection between said members, in combination with the wheel spindle by which said driving and driven members are carried and resilient means for cushioning the said driven member with relation to said spindle, said resilient means comprising diametrically opposite cylinders and a rotary support therefor constantly coaxial with the driving member of the wheel, a ring journaled in the driven member of the wheel and plungers connected thereto working in said cylinders, and means in connection with said cylinders for resiliently supporting said plungers in said cylinders, together with spring means engaging said ring and acting upon the same at right angles to the action of the said pistons whereby said driven member is forced back into coaxial relation to the driving member upon being rendered eccentric thereto, substantially as described.

In testimony whereof I have signed my name to this specification, in the presence of two subscribing witnesses.

PIERRE DECAUVILLE.

Witnesses:
   GUSTAVE DUMONT,
   CHARLES DOMP.

---

Copies of this patent may be obtained for five cents each, by addressing the "Commissioner of Patents, Washington, D. C."